April 27, 1954   D. J. POVEJSIL   2,677,063
PARALLEL OPERATION OF GENERATORS WITH UNLIKE CHARACTERISTICS
Filed Dec. 12, 1950   2 Sheets-Sheet 1

WITNESSES:
Robert C. Baird
Wm. C. Groove

INVENTOR
Donald J. Povejsil.
BY
Paul E. Friedemann
ATTORNEY

Patented Apr. 27, 1954

2,677,063

UNITED STATES PATENT OFFICE 2,677,063

PARALLEL OPERATION OF GENERATORS WITH UNLIKE CHARACTERISTICS

Donald J. Povejsil, Edgewood, Pa., assignor to Westinghouse Electric Corporation, East Pittsburgh, Pa., a corporation of Pennsylvania Application December 12, 1950, Serial No. 200,387

9 Claims. (Cl. 307—57)

My invention relates to generator systems that involve an at least temporary parallel operation of a series-excited generator having a rising characteristic with a shunt or separately excited generator having a drooping characteristic.

It is an object of my invention to permit such a parallel operation under satisfactory stability conditions and with the possibility of dividing the load between the different machines in any desired manner.

It is also an object of my invention to permit and facilitate a smooth load transfer from a rising-characteristic generator to a drooping-characteristic generator and vice versa without interruption or appreciable disturbance of the load circuit and without unstable motoring of either generator or shunting between the generators while they are operating in parallel.

A very high amplification and good regulation can be obtained with two-stage or multi-stage amplifying generators of the kind known from Patent 2,464,835 of A. W. Kimball and W. R. Harding; Patent 2,484,840 of M. Liwschitz and A. W. Kimball; and Patent 2,445,788 of B. Litman, all assigned to the assignee of the present invention. As a rule, such machines are series excited. Due to their rising characteristic, they do not permit a stable parallel operation with conventional shunt or separately excited exciter generators having a drooping characteristic. The need for paralleling arises, for instance, when the normally active amplifying generator, supplying an alternator field winding or other load, is to be taken out of service and to be temporarily replaced by a conventional, drooping-characteristic exciter. Heretofore, it has been necessary in such cases to first remove the amplifying generator from service by unloading it and then bringing the spare exciter in by the usual starting-up procedure. This is objectionable because of the system disturbance caused when the alternator field circuit is opened. An aim of my invention, therefore, is to provide for a generator paralleling and transfer method, applicable for the just-mentioned purpose, that avoids an interruption of service and a disturbance of the load circuit, and secures a stable operation of the generators being paralleled.

An object of my invention more specific than those already mentioned and distinctive from those of United States Letters Patent No. 2,608,-630, assigned to the same assignee, entitled "Electric Current Generating Means," and issued to J. E. Barkle and D. F. Shankle on August 26, 1952, is the desire to achieve the above-mentioned paralleling performance with the aid of means outside the armature circuit of the amplifying generator that normally operates with a rising external characteristic under automatic regulation of its output. In other words, where the normal regulated load is carried by such an amplifying generator, my invention aims at leaving the armature circuit of this generator free of any impedient devices that come into play only during emergency or other unusual conditions which require a temporary substitution by a shunt or separately excited standby exciter. A related object of the invention is to confine any losses due to such auxiliary impedance devices to those periods in which the spare or standby exciter is in operation, this period being in many cases very short in comparison with the operating period of the main amplifying generator. Another similar object of the invention is to minimize the equipment needed during paralleling so that one and the same exciter, suitably equipped, may serve as a standby for several normally operating amplifying generators.

To achieve the above-mentioned objects and in accordance with a feature of my invention, an amplifying series-excited generator of normally rising external voltage-current characteristic has a regulating field winding which, when effective, opposes the normal series excitation to impart to the external characteristic a drooping shape corresponding to that of a drooping-characteristic exciter to be paralleled. This regulating field winding, when thus effective, has its circuit impressed by voltage derived from, or dependent upon, the current in the armature circuit of the exciter machine and also impressed by an adjustable bias voltage.

These and other features of the invention, set forth with particularity in the annexed claims, will be apparent from the following description in conjunction with the drawings, in which:

Figure 1:
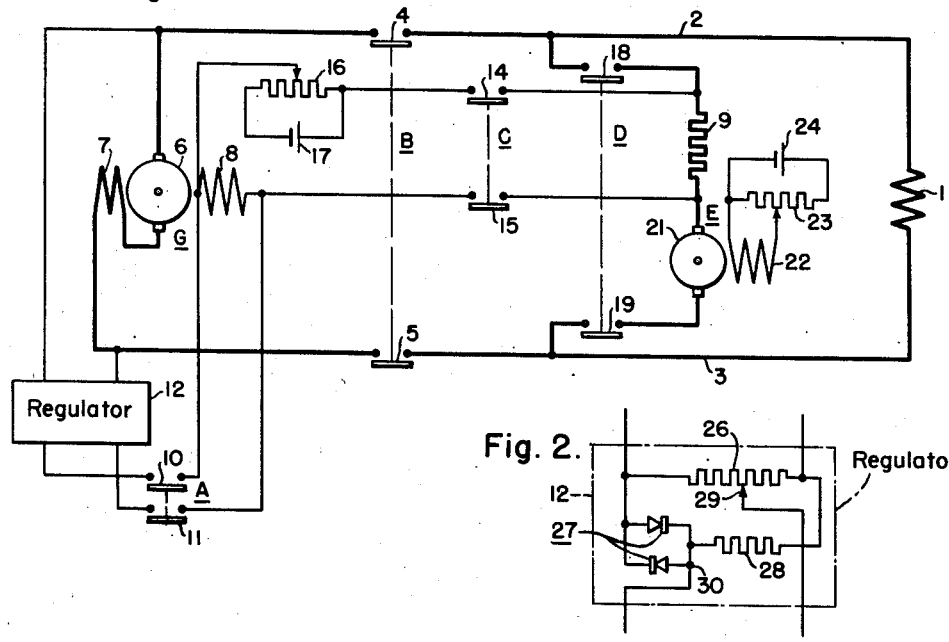
Figure 1 shows a circuit diagram of an embodiment of my invention including an amplifying generator for normal operation and a standby generator of the conventional exciter type.

In Fig. 1, the load to be energized is schematically indicated at 1. This load may consist of the field winding of a large turbine-driven alternator whose output voltage is to be kept constant. The load 1 is connected across buses 2 and 3. The contacts 4 and 5 of a circuit breaker B connect buses 2 and 3 with the armature 6 of an amplifying generator G. This generator has a series field winding 7 and a separately excited regulating field winding 8. In order to secure the desired high ratio of amplification, the series field is preferably tuned to the no-load saturation characteristic of the machine so that the self-excited field winding 7 normally provides all or most of the excitation needed to maintain the generator output at any desired value within the available voltage range, the regulating winding 8 then being called upon only to supply a relatively slight additive or subtractive excitation needed to vary the output voltage from any departure back to the desired magnitude. While the amplifying generator G may have any suitable design, for instance according to the first above-mentioned group of patents, only the elements essential for the present invention are illustrated.

During the normal performance of the generator G, with contacts 4 and 5 of breaker B closed, the regulating field winding 8 is connected, through the contacts 10 and 11 of a switching device A, with the output terminals of a regulator 12. This regulator is inputwise connected across the armature circuit of generator G and supplies the field winding 8 with an error or intelligence voltage whose magnitude and polarity correspond to the magnitude and direction of the departure of the generator voltage from any adjusted desired value. Various regulator circuits capabl of providing such a reversible error voltage are well knonw as such. Some of them, for instance, include a supply of an adjustable constant pattern voltage which is compared with the voltage to be regulated so that the difference of these two voltages, or a voltage proportional to that difference, appears across the regulator output terminals. Another type of suitable regulator circuit involves a normally balanced bridge circuit composed of linear and non-linear impedances. A regulator of the latter type, well suitable for the purposes of the invention, will later be described with reference to Fig. 2.

The load buses 2 and 3 can be connected, through the contacts 18 and 19 of a switch D, with the armature 21 of an exciter generator E. In the illustrated example, the field winding 22 of the exciter E is separately excited by selectively adjustable voltage from a potentiometer rheostat 23 connected to a suitable source of constant voltage schematically represented at 24. This voltage source may be identical with the one represented at 17 and mentioned in the following. A resistor 9 is series connected in the armature circuit of the exciter E to provide a voltage drop proportional to the exciter current.

The contacts 14 and 15 of a switching device C, when closed, connect the regulating field winding 8 and the resistor 9 in series relation to a selectively adjusted portion of a potentiometer rheostat 16 whcih is energized from a suitable source of direct-current voltage schematically indicated at 17. This source may consist, for instance, of a small exciter, a battery, a rectifier connected to an alternating-current supply, or, as will be shown in the following, the energization for the rheostat 16 may be taken from the generator load circuit. While the switching devices A and C, for the sake of simple illustration, are shown as separate units, it should be understood that only one of them is closed at a time so that they may form part of a single selectively operable switching apparatus. Whenever the switching device C is closed while device A is open, the regulating field winding 8 receives separate excitation of adjusted magnitude from the rheostat 16. The field winding 8 then has a compounding effect which modifies the normal series machine characteristic toward that of a separately excited or shunt-excited machine when the exciter E is operating as a generator. This modifying compounding effect is subject to the resultant voltage from elements 9 and 17.

Figure 2:
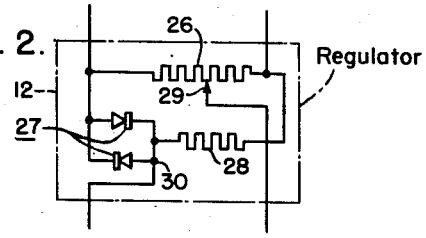
Fig. 2 shows the circuit diagram of a detail.

According to Fig. 2, the regulator 12 may essenitally consist of a bridge-type network which is excited from the generator output voltage. This voltage is impressed across a potentiometer rheostat 26 and across a parallel-connected circuit which includes a non-linear resistance portion in the form of dry-type rectifiers 27 and a linear resistance portion in the form of a conventional wire-wound resistor 28. For a given voltage across the bridge circuit, there is a position of the slider 29 on the potentiometer rheostat 26 where the potential across the bridge output points 29 and 30 and hence the voltage across the output leads of the regulator 12 is zero. Consequently, when in the embodiment of Fig. 1 the voltage of the amplifying generator during normal operation has the correct value (A and B closed), no voltage is impressed across the regulating field winding 8 of this generator.

When the rheostat slider 29 is displaced, for instance in the raise direction, a new magnitude of voltage appears across the non-linear or rectifier portion 27 of the circuit as well as across the linear resistance portion 28. A new balance point is thus established at a new level of amplified terminal voltage. Consequently, when the amplifier output voltage increases due to the change in adjustment, a magnitude of output voltage will be reached where the regulator bridge circuit is again in balance and the voltage impressed on the regulating field winding 8 is again zero or is at whatever small value of current satisfies the amplifying generator at the new level of output voltage.

When the amplifier output voltage is set at a given level and should this voltage tend for any reason to drift, for example to rise, the action on the bridge circuit of the regulator is such as to cause the field current in regulating winding 8 to change in the direction that causes the amplifying generator voltage to return to its previous value. This regulating function takes place by reason of the action between the non-linear resistance and the linear resistance in the regulator bridge circuit.

The above-described regulator, or any other regulator of equivalent performance, is not suitable for controlling the voltage of the amplifying generator during paralleling because the regulator control will tend to maintain the amplifier output voltage at a fixed, though selected, value, regardless of the load on the amplifying machine. The voltage level when the two machines are operating in parallel, however, is not fixed by the amplifier output voltage alone. Therefore, some intelligence is required to keep either machine from taking more than its proper share of the load. This intelligence is provided by the current-responsive feedback circuit with which the regulating field winding 8 is connected when the switching device C is closed. Then the excitation of control field winding 8 aids the flux produced by the series field with the results apparent from the following description of the operation of the system during paralleling performance.

Assume that the amplifying generator G is carrying the load, with breaker B and switch A closed and regulator 12 effective to maintain the load voltage 1 at the desired value by regulating the current in the field winding 8 in the above-explained manner. The rheostat 16 is normally set for zero bias voltage. If now the amplifying generator G is to be replaced by the previously idle exciter generator E, the following operation is to be performed:

1. The voltage of the exciter E is first adjusted by means of its field rheostat 23 to equal the load voltage of the amplifying generator G.

2. When the two voltages are equal, switches C and D are closed and switch A is opened. This places the two machines in parallel and changes the source of excitation for regulating field winding 8 from the regulator 12 to the feedback circuit. Now the exciter E is acting as a system regulator. If the exciter E attempts to deliver current, the resulting feedback voltage from across the series resistor 9 will raise the output voltage of the amplifying generator G in such a manner that the generator G will take the load away from the exciter E. If the exciter E attempts to motor, the feedback circuit will lower the output voltage of the amplifying generator G so that it cannot deliver the necessary motoring current.

3. In order to divide the load, it is necessary to increase the bias voltage from zero in such a way that it opposes the feedback signal. Consequently, now the rheostat 16 is adjusted accordingly. This has the effect of detuning the amplifying generator G and forcing the exciter E to deliver load current in order to maintain its regulator action.

4. When thus the load has been fully transferred to the exciter E, switch B is opened, leaving the exciter E to carry the load.

Assume now that the exciter E is carrying the load and that the previously idle amplifying generator G is to be parallel connected before assuming the load-carrying duty. Then the following steps are to be taken:

1. Switch C is closed and switch A opened. This causes the amplifying generator G to operate under no load as a shunt-type generator receiving its excitation from the resistance drop across the series resistor 9 in the load-carrying armature circuit of the exciter E.

2. By adjusting the bias voltage at rheostat 16, the terminal voltage of the amplifying generator G is now made equal to the load voltage supplied from the exciter E.

3. When the two voltages are equal, switch B is closed placing the two machines in parallel.

4. The load is now transferred to generator G by reducing the bias voltage from rheostat 16 to zero.

5. Thereafter the excitation of the exciter E is adjusted by means of rheostat 23, or instead the output voltage of regulator 12 is set, so that the regulator output voltage equals the output voltage of the feedback circuit.

6. When this is done, switch A is closed and switches C and D are opened whereby the exciter E is removed from the load buses.

Figure 3:
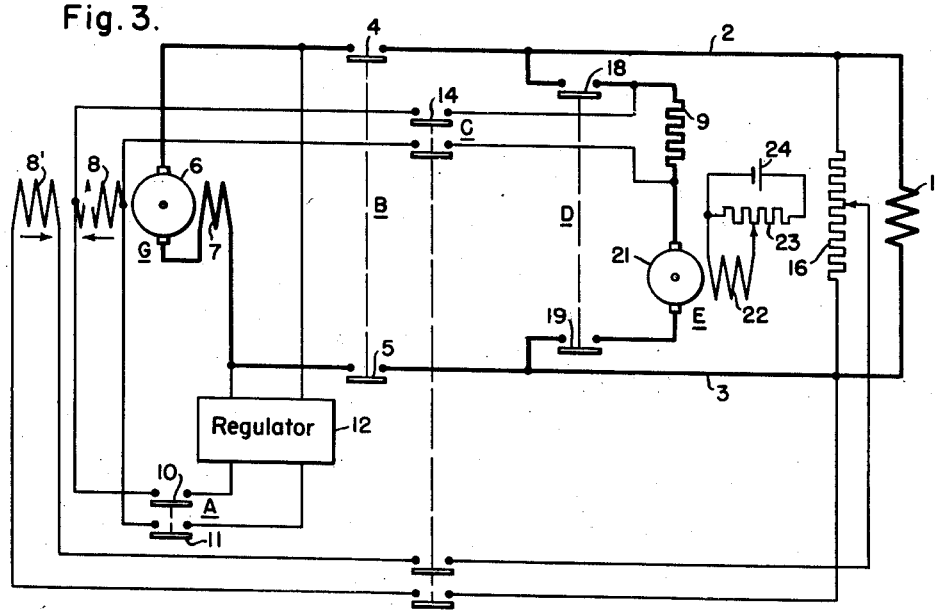
Figs. 3 and 4 show the circuit diagrams of other embodiments of my invention.

The embodiment illustrated in Fig. 3 is basically similar to that of Fig. 1. For that reason, the circuit elements of Fig. 3 denoted by reference numerals between 1 and 24 correspond to the similarly denoted elements, respectively, of Fig. 1, and the following description is substantially limited to the differences of the second embodiment over the above-described design of the system shown in Fig. 1.

According to Fig. 3, the amplifying generator is equipped with two regulating field windings 8 and 8'. The regulating field winding 8 is connected through switch A to the regulator 12 when the generator G is in normal, load-carrying operation, and the field winding 8' is then deenergized. During paralleling operation, when switch A is open and switch C is closed, the field winding 8 is connected across the series resistor 9 in the armature circuit of the exciter E, and the field winding 8' is simultaneously connected to a source of bias voltage. The excitation of field winding 8' then opposes that of the field winding 8 when exciter E is operating as a generator so that both windings together perform the function of the single field winding 8 shown in Fig. 1.

In further contrast to Fig. 1, the bias voltage in the embodiment of Fig. 3 is taken from the load circuit of the two generators. To this end the bias-adjusting rheostat 16 is connected across the load buses 2 and 3.

As regards essential performance, the embodiment of Fig. 3 is similar to that of Fig. 1, and the steps of paralleling performance are the same as above described.

Figure 4:
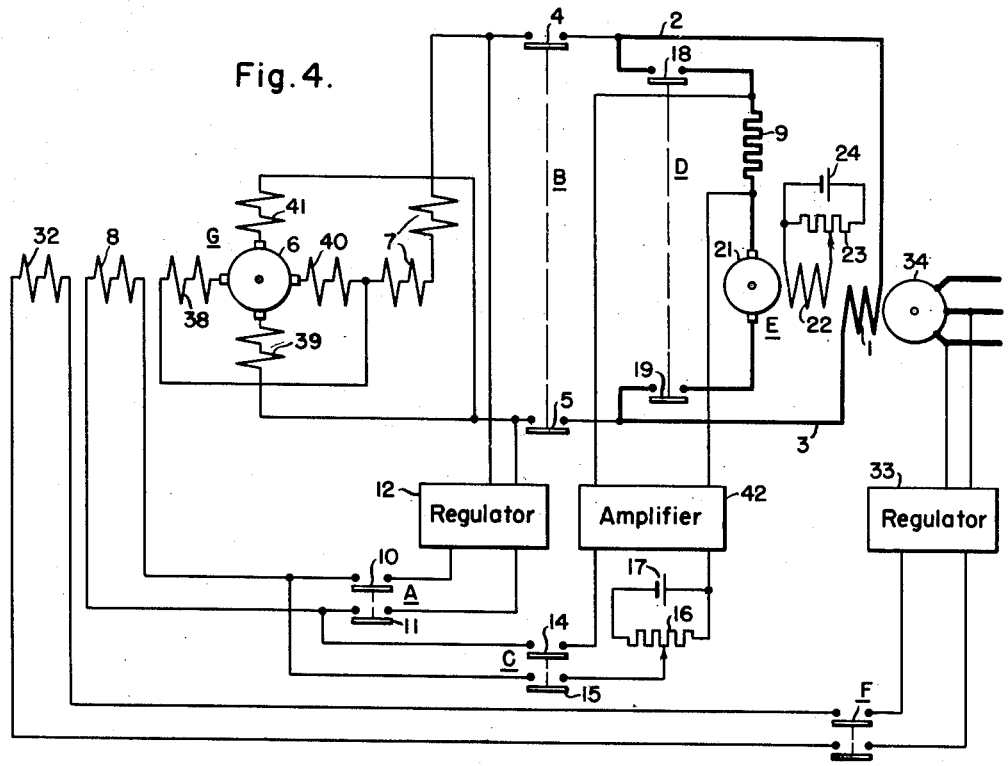

The embodiment shown in Fig. 4 is also similar to that of Fig. 1, reference numerals between 1 and 28 again denoting elements similar to the corresponding elements in Fig. 1. Therefore, the following description is limited to distinctive differences of the embodiment shown in Fig. 4.

According to Fig. 4, the amplifying generator G has a separately excited control winding 32 energized through a regulator 33 from the output buses of an alternator 34 whose field winding 1 is normally excited from the generator G. The regulator 33 provides proper intelligence of voltage level to a balanceable bridge circuit made up of non-linear impedance and linear impedance and so arranged that any deviation of the alternator terminal voltage from the level which the regulator 33 is set to hold causes a change in the voltage supplied to the control field winding 32. The regulating generator G is thus caused to raise or lower its output voltage as required to return the alternator voltage to the normal value.

The amplifying generator G is shown in Fig. 4 as being of the plural-stage type according to the above-mentioned patents, with four poles and two pairs of brushes. Forcing field coils and other field windings are connected in two circuits each extending between two brushes of the same external polarities so that the field excitation of the machine is partly due to internal circulating currents which flow between the brushes due to an asymmetrical control excitation provided by the control field winding 32 or by the regulating field winding 8 when the latter is in operation. The field windings excited by internal circulating current flowing between equipolar brushes are schematically represented at 38, 39, 40 and 41.

The current-responsive feedback excitation imposed on the regulating field winding 8 during the periods in which this winding is in operation is taken exclusively from across a low-ohmic series resistor 9. An amplifier 42 is inserted between the resistor and the field circuit of winding 8 in series with the adjusted portion of the potentiometer rheostat 16 which in other respects is connected and effective in the same manner as the rheostat 16 of the system shown in Fig. 1.

The amplifier 42 may consist of a magnetic amplifier, i. e., of a static type device composed of saturable reactor means with series-connected rectifier units which may consist of dry or junction-type devices.

The performance and operating method of the embodiment shown in Fig. 4 is substantially identical with the performance and paralleling method of the embodiment according to Fig. 1, except that in the system of Fig. 4 a switch F is to be opened immediately before the previously active generator G is to be paralleled with exciter E, or immediately after the paralleling of the previously idle generator G is completed.

It will be obvious to those skilled in the art after a study of this disclosure that the invention is accessible to various modifications and may be embodied in circuits other than those specifically disclosed without departing from the objects and essence of the invention and within the scope of the claims annexed hereto.

I claim as my invention:

1. Electric current-generating means, comprising a drooping-characteristic first generator having a first armature circuit, a series-excited second generator of normally rising characteristic having a second armature circuit and separately excited regulating field winding means, load buses to which said two armature circuits are connected in parallel relation to each other, current-responsive circuit means connecting said first armature circuit with said winding means to provide said winding means with regulating excitation dependent upon the current in said first armature circuit, said circuit means being poled to have said regulating excitation oppose the series excitation of said second generator, and bias voltage supply means of adjustable voltage also connected with said winding means in opposed relation to said regulating excitation.

2. Electric current-generating means, comprising a drooping-characteristic first generator having a first armature circuit, a series-excited second generator of normally rising characteristic having a second armature circuit and a separately excited regulating field winding, load buses to which said two armature circuits are connected in parallel relation to each other, a control circuit connected to said winding and having current-responsive circuit means connected with said first armature circuit to impress on said winding a voltage depending upon the current in said second armature circuit, said winding being poled to oppose, due to said voltage, the series excitation of said second generator, and a source of adjustable bias voltage series connected in said control circuit in voltage opposed relation to the voltage in said circuit means.

3. Electric current-generating means, comprising a drooping-characteristic first generator having a first armature circuit, a series-excited second generator of normally rising characteristic having a second armature circuit and two differential regulating field windings, current-responsive circuit means connecting said first armature circuit with one of said windings to provide it with regulating excitation dependent upon the current in said first armature circuit, said one winding being poled to oppose due to said regulating excitation the series excitation of said second generator, and adjustable voltage supply means connected with said other winding.

4. Electric current-generating means, comprising a drooping-characteristic first generator having a first armature circuit, a series-excited second generator of normally rising characteristic having a second armature circuit and a separately excited regulating field winding, load buses to which said two armature circuits are connected in parallel relation to each other, control circuit means current-responsively connected with said first armature circuit to provide variable voltage according to the current in said first armature circuit and having voltage supply means of adjustable voltage to provide a regulating voltage as the resultant of said variable and adjustable voltages, said circuit means being connected with said field winding to impress said resultant voltage thereon, and said field winding being poled to oppose the series excitation of said second generator.

5. Electric current-generating means, comprising a drooping characteristic first generator having a first armature circuit, a series-excited second generator of normally rising characteristic having a second armature circuit and having separately excited field means, load buses, selective switch means connecting either armature circuit and both respectively across said buses, condition-responsive regulator means connected with said field means when only said second armature circuit is connected with said buses and having error voltage supply means for exciting said field means in dependence upon a condition controlled by said second generator, control circuit means current-responsively connected with said first armature circuit to provide variable voltage according to the current in said first armature circuit and having voltage supply means of adjustable voltage to provide a regulating voltage as the resultant of said variable and adjustable voltages, said circuit means being connected with said field means only when both armature circuits are connected with said buses to then impress said resultant voltage on said field means in opposition to the series excitation of said second generator.

6. Electric current-generating means, comprising a drooping-characteristic generator having a first armature circuit, an amplifying generator having a second armature circuit with a series field winding and having a regulating field winding and an appertaining field circuit, load buses to which said two armature circuits are connectable in parallel relation to each other, a series resistor in said first armature circuit to provide a voltage drop proportional to the current in said first armature circuit, an amplifier inputwise connected across said resistor and outputwise connected with said field circuit with the polarity needed to make said regulating field winding oppose said series field winding in said second armature circuit in accordance with said current in said first armature circuit, and voltage supply means having an adjustable potentiometer rheostat connected in said field circuit in series relation to said amplifier.

7. Electric current-generating means, comprising load buses, a drooping-characteristic generator having a first armature circuit and switch means for connecting said first armature circuit to said buses, a series-excited generator of normally rising characteristic having a second armature circuit and switch means for connecting said second armature circuit to said buses, said switch means being selectively operable to connect either and both armature circuits respectively to said buses, a series resistance means in said first armature circuit to provide a voltage drop depending upon the current in said first armature circuit, said series-excited generator having a regulating field winding operable when both generators are connected to said buses and opposingly related to the generator series excitation to impart to said series-excited generator a drooping characteristic, adjustable-voltage supply means, and circuit means connecting said regulating field winding across said resistance means in series with said supply means for varying the excitation of said regulating field winding in dependence upon said voltage drop.

8. Electric current-generating means, comprising load buses, a drooping-characteristic generator having a first armature circuit and appertaining switch means selectively connecting said first armature circuit to said buses, a series-excited generator of normally rising characteristic having a second armature circuit and appertaining switch means selectively connecting said second armature circuit to said buses, whereby either and both generators are selectively connectable to said buses, said series-excited generator having a regulating field winding operable when both generators are connected to said buses and opposingly related to the generator series excitation to impart to said series-excited generator a drooping characteristic, a resistor series connected in said first armature circuit to provide a voltage drop depending upon the current in said first armature circuit, a source of adjustable bias voltage, and circuit means connected across said resistor and connecting said regulating field winding in series with said source for varying the excitation of said field winding in dependence upon said voltage drop.

9. Electric current-generating means, comprising load buses, a drooping-characteristic generator having an armature circuit, switch means selectively connecting said armature circuit to said buses, a series-excited generator of normally rising characteristic and having an armature circuit, switch means selectively connecting the armature circuit of the series-excited generator to said buses, said series-excited generator having regulating field winding means, regulator means responsive to an electric condition of the armature circuit of the series-excited generator to provide an error voltage indicative of the departure of said condition from a desired value, current feedback control means having series resistance means in said first-mentioned armature circuit to provide a control voltage variable in accordance with the current in said first-named armature circuit, and selective switch means connecting said regulating field winding means with said regulator means and with said control means respectively for selectively controlling said regulating field winding means by said error and control voltages respectively, said control means when connected with said regulating field winding means having the polarity needed to impart to said series-excited generator a drooping characteristic.

References Cited in the file of this patent

UNITED STATES PATENTS

| Number | Name | Date |
|---|---|---|
| 1,617,130 | McDonald | Feb. 8, 1927 |
| 1,693,307 | McDonald | Nov. 27, 1928 |
| 1,723,039 | Hough | Aug. 16, 1929 |
| 1,925,876 | Mills | Sept. 5, 1933 |
| 2,282,196 | Lynn | May 5, 1942 |